(12) United States Patent
Hiraga

(10) Patent No.: US 10,635,778 B2
(45) Date of Patent: Apr. 28, 2020

(54) METHOD FOR COMPUTER SIMULATION AND METHOD FOR GENERATING A TRANSMISSION LINE MODEL

(71) Applicant: Rohm Co., Ltd., Kyoto (JP)

(72) Inventor: Noriaki Hiraga, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 162 days.

(21) Appl. No.: 15/454,013

(22) Filed: Mar. 9, 2017

(65) Prior Publication Data

US 2017/0270237 A1    Sep. 21, 2017

(30) Foreign Application Priority Data

Mar. 18, 2016  (JP) ................. 2016-055700
Mar. 18, 2016  (JP) ................. 2016-055704
Jan. 12, 2017   (JP) ................. 2017-003148

(51) Int. Cl.
| | | |
|---|---|---|
| *G06F 17/50* | (2006.01) | |
| *B60R 16/02* | (2006.01) | |
| *H01B 7/00* | (2006.01) | |
| *H01P 3/10* | (2006.01) | |

(52) U.S. Cl.
CPC ...... *G06F 17/5095* (2013.01); *B60R 16/0207* (2013.01); *G06F 17/5009* (2013.01); *H01B 7/0045* (2013.01); *H01P 3/10* (2013.01)

(58) Field of Classification Search
CPC ............. G06F 17/5095; G06F 17/5009; G60R 16/0207; H01B 7/0045; H01P 3/10
USPC ........................................................... 703/8
See application file for complete search history.

(56) References Cited

U.S. PATENT DOCUMENTS

2015/0097575 A1    4/2015  Hiraga

FOREIGN PATENT DOCUMENTS

| JP | 2013-242649 A | * | 5/2013 |
| JP | 2013-242649 | | 12/2013 |
| JP | 2015-075390 | | 4/2015 |

OTHER PUBLICATIONS

Iskander_1992 (Electromagnetic Fields & Waves Prentice Hall 1992).*
Rao_1994 (Elements of Engineering Electromagnetics, 4th Edition, Prentice Hall, 1994).*
AN5141_2012 (An Improved and Simple Cable Simulation Model, Oct. 22, 2012 Application Note 5141 Maxim Integrated).*

(Continued)

*Primary Examiner* — Brian S Cook
(74) *Attorney, Agent, or Firm* — Fish & Richardson P.C.

(57) ABSTRACT

A method for generating a transmission line model includes classifying a transmission line which is a modeling target as one of at least two types comprising an end line and a middle line according to a laid state of the transmission line and modeling the end line and the middle line individually to generate an end-line model and a middle-line model. The end-line model and the middle-line model each include, as parameters representing their respective transmission characteristics, a characteristic impedance and a delay time. A method for computer simulation includes evaluating the immunity characteristics or emission characteristics of a tested device while sweeping a parameter which is a parameter, left variable, of a transmission line model that models the transmission line to which the tested device is connected.

2 Claims, 19 Drawing Sheets

(56) References Cited

OTHER PUBLICATIONS

Iskander_ 1992 (Electromagnetic Fields & Waves Prentice Hall 1992) (Year: 1992).*
Rao_1994 (Elements of Engineering Electromagnetics, 4th Edition, Prentice Hall, 1994). (Year: 1994).*
AN5141_2012 (An Improved and Simple Cable Simulation Model, Oct. 22, 2012 Application Note 5141 Maxim Integrated). (Year: 2012).*
Tanaka et al., "A Simulation Model of Bulk Current Injection(BCI)Test" The Institute of Electronics Information and Communication Engineers, Date of publication : Aug. 31, 2012, (4 pages).

* cited by examiner

FIG. 12

| WIRE TYPE | MODEL CLASSIFICATION | CHARACTERISTIC IMPEDANCE | UNIT DELAY TIME |
|---|---|---|---|
| CPAVS0.75f | SINGLE-LINE MODEL | Z0=300[Ω] | TD=6.13[ns/m] |
| | END-LINE MODEL | Z0=520[Ω] | TD=6.13[ns/m] |
| | MIDDLE-LINE MODEL | Z0=2600[Ω] | TD=6.13[ns/m] |
| IV8mm²LFV | SINGLE-LINE MODEL | Z0=207[Ω] | TD=6.09[ns/m] |
| | END-LINE MODEL | Z0=364[Ω] | TD=6.09[ns/m] |
| | MIDDLE-LINE MODEL | Z0=2400[Ω] | TD=6.09[ns/m] |

METHOD FOR COMPUTER SIMULATION AND METHOD FOR GENERATING A TRANSMISSION LINE MODEL

CROSS-REFERENCE TO RELATED APPLICATIONS

This application is based on the following Japanese patent applications, the contents of which are hereby incorporated by reference:
(1) Japanese Patent Application published as No. 2016-055700 (filed on Mar. 18, 2016)
(2) Japanese Patent Application published as No. 2016-055704 (filed on Mar. 18, 2016)
(3) Japanese Patent Application published as No. 2017-003148 (filed on Jan. 12, 2017)

BACKGROUND OF THE INVENTION

1. Field of the Invention

The present invention relates to a method for computer simulation for evaluating immunity characteristics or emission characteristics, and relates also to a method for generating a transmission line model.

2. Description of Related Art

Conventionally, in the designing of a structure (vehicle, railroad vehicle, marine vessel, aircraft, or the like) having a transmission line such as an electric conductor wire harness, or in the designing of various electric components mounted in it, as means for evaluating their immunity characteristics or immunity characteristics, EMC (electromagnetic compatibility) computer simulation is widely used beside measurement bench marks.

Examples of prior art related to what is just mentioned are found in Japanese Patent Application published as No. 2015-75390 by the present inventor, Japanese Patent Application published as No. 2013-242649, and an article by Hiroya TANAKA et al., "Simulation Models of BCI (bulk current injection) test systems," Technical Research Report. EMCJ, Environmental Electromagnetic Engineering, The Institute of Electronics, Information and Communication Engineers, Aug. 31, 2012, Volume 112, Issue 201, pp. 47-50).

However, in conventional EMC computer simulation, wire harness structures for measurement bench marks that are subject to strict restrictions are modeled as they are. For example, in a case where a measurement bench mark requires that the total wire harness length be 1700 to 2000 mm and that the number of EMC noise injection points be three (positions at the distances of 150 mm, 450 mm, and 750 mm from a DUT), the wire harness structure for EMC computer simulation is subject to restrictions similar to those in the measurement bench mark. This results in insufficient coverage of phenomena that actually occur, making it difficult to evaluate actual immunity characteristics or emission characteristics properly.

Moreover, in conventional EMC computer simulation, a wire harness model is represented by a single characteristic impedance. This results in not small deviations between measured values and simulated values.

SUMMARY OF THE INVENTION

To address the above-discussed problems encountered by the present inventor, proposed herein will be a method for computer simulation that allows proper evaluation of immunity characteristics or emission characteristics. Also proposed herein will be a method for generating a transmission line model that allows reduction of deviations between measured values and simulated values.

According to one aspect of what is disclosed herein, a method for computer simulation includes: evaluating the immunity characteristics or emission characteristics of a tested device while sweeping a parameter which is a parameter, left variable, of a transmission line model that models the transmission line to which the tested device is connected.

According to another aspect of what is disclosed herein, a method for generating a transmission line model for computer simulation includes: classifying a transmission line which is a modeling target as one of at least two types comprising an end line and a middle line according to the laid state of the transmission line; and modeling the end line and the middle line individually to generate an end-line model and a middle-line model.

Other features, elements, steps, benefits, and characteristics of the present invention will become clearer with reference to the following description of preferred embodiments thereof in conjunction with the accompanying drawings.

BRIEF DESCRIPTION OF THE DRAWINGS

FIG. 12 is a table showing parameter values of transmission line models;

DETAILED DESCRIPTION OF PREFERRED EMBODIMENTS

Figure 1:
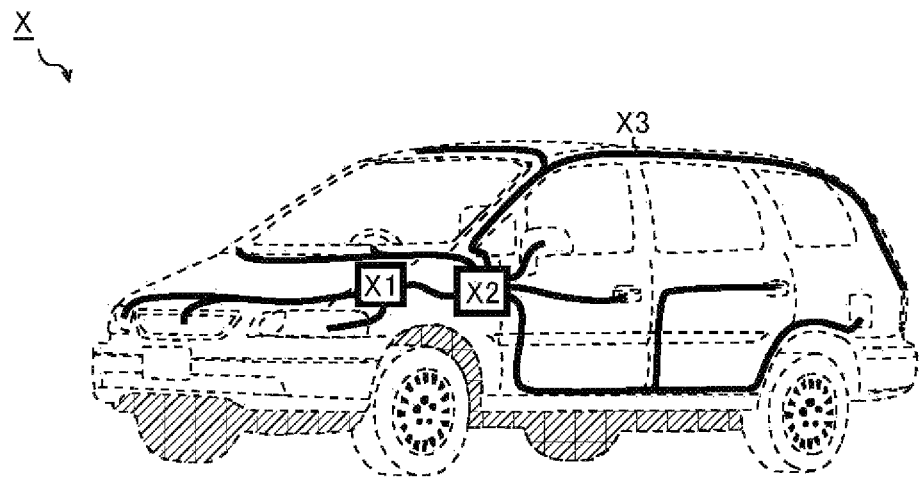
FIG. 1 is a schematic diagram of a wire harness network laid around a vehicle.

Wire Harness Network:

FIG. 1 is a schematic diagram of a wire harness network laid around a vehicle (that is, a skeleton diagram of the vehicle). In a modern vehicle X, numerous electric components (various lamps, various pumps, various fans, electronic suspensions, wipers, door locks, power windows, power door mirrors, and the like) are mounted. Between these electric components at one end and a battery X1 and an ECU (electronic control unit) X2 at the other end, there is laid a network of wire harnesses X3 for transmission of electric power and signals. Incorporating so numerous electric components, the vehicle X is subjected to various immunity tests and emission tests for higher safety and reliability.

Wire harness networks are laid also in structures other than vehicles, such as railroad vehicles, marine vessels, aircraft, and the like.

Figure 2:
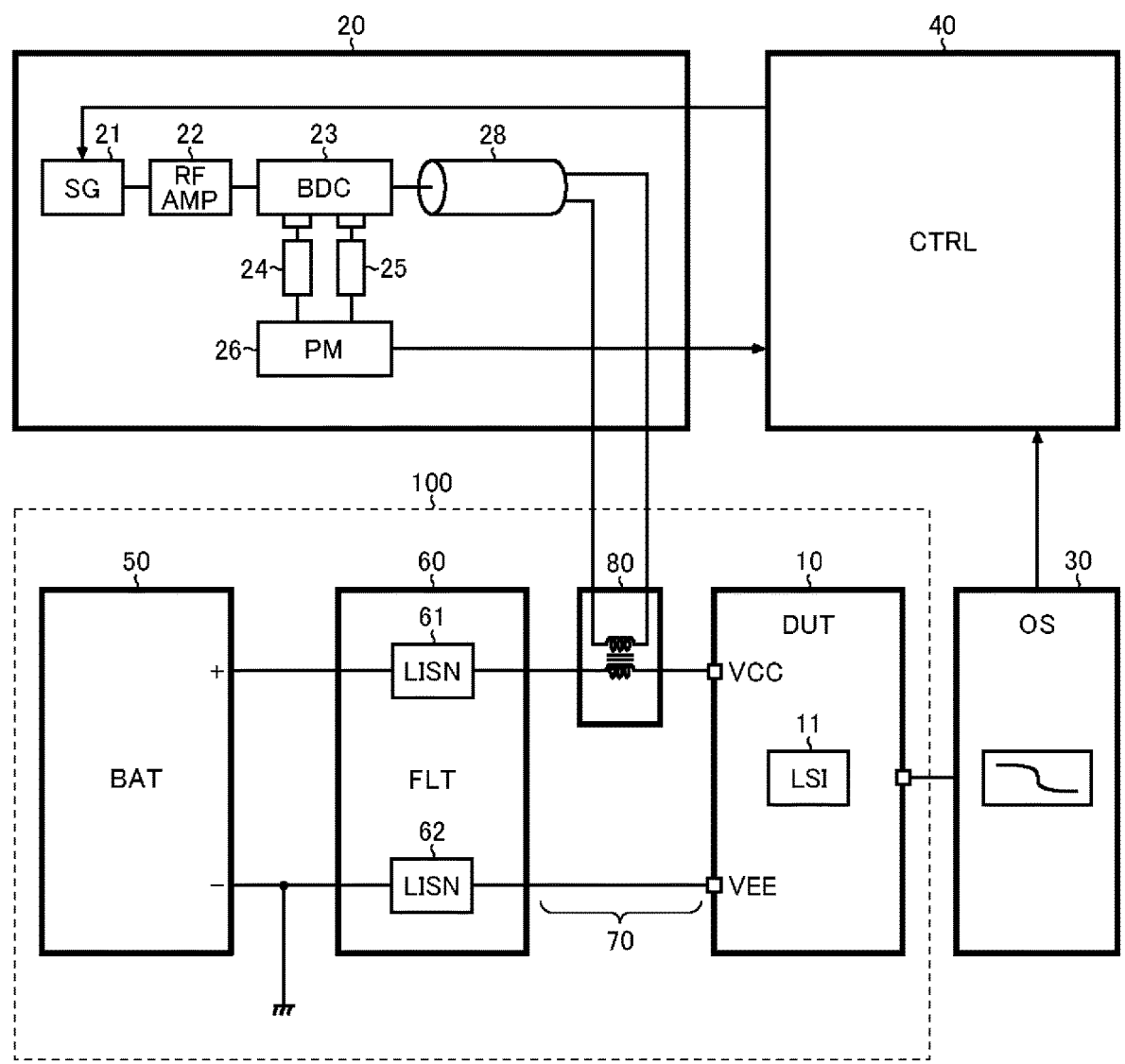
FIG. 2 is a block diagram showing an example of an electric component BCI test.

Electric Component BCI Test (ISO 11452-4):

FIG. 2 is a block diagram showing one configuration example of a BCI (bulk current injection) test for an electric component. An electric component BCI test is a kind of immunity test that conforms to the standard formulated by International Organization for Standardization (ISO), "Road vehicles Component test methods for electrical disturbances from narrowband radiated electromagnetic energy—" (ISO 11452-4).

Described more specifically with reference to FIG. 2, an electric component BCI test is performed by use of a noise source 20, a detector 30, a controller 40, and an injection probe 80 as a measurement bench mark for evaluating the immunity characteristics of a measurement target circuit unit 100 (or a unit simulating it).

The measurement target circuit unit 100 corresponds to an actual product (actual device) on which a device-under-test 10 (hereinafter referred to as DUT 10) is mounted, and includes, in addition to the DUT 10, a battery 50, a power filter 60, and a wire harness 70. The measurement target circuit unit 100 may further include a dummy load of the DUT 10.

The DUT 10 includes an LSI (large-scale integrated circuit) 11 and a printed circuit board (PCB) on which it is mounted. Needless to say, the LSI 11 alone may be used as the DUT 10. The DUT 10 does not necessarily have to be an actual device; instead, in general, a simulating device for testing is often used.

In particular, for the purpose of comparison among a plurality of LSIs (for example, comparison between a new and an old model of an LSI, or comparison between a proprietary LSI and a compatible, third-party LSI), it is preferable to use simulating devices for testing that share common features (the size of and the conductor pattern on the PCB, the types and characteristics of discrete components mounted on the PCB, and the like) except for the LSI that is the evaluation target.

The noise source 20 is the principal component in injecting a high-frequency noise signal (disturbing wave electric power) to a terminal (in FIG. 2, a power terminal VCC is taken as an example) of the DUT 10, and includes a signal generator 21, and an RF amplifier 22, a bidirectional coupler 23, a progressive wave power sensor 24, a reflected wave power sensor 25, a power meter 26, and a 50Ω transmission line 28.

The signal generator (SG) 21 generates a high-frequency noise signal with a sinusoidal waveform. As necessary, the signal generator 21 can modulate the high-frequency noise signal. The oscillation frequency, amplitude, and modulation of the high-frequency noise signal can all be controlled by the controller 40. In a case where the disturbing wave is pulses, a pulse generator (PG) may be used instead; in a case where the disturbing wave is impulses, an impulse generator (IG) may be used instead.

The RF (radio-frequency) amplifier 22 amplifies at a predetermined gain the high-frequency noise signal generated by the signal generator 21.

The bidirectional coupler (BDC) 23 separates the high-frequency noise signal generated by the RF amplifier 22 into a progressive wave component that travels toward the DUT 10 and a returning wave component that returns from the DUT 10.

The progressive wave power sensor 24 measures the power of the progressive wave component separated by the bidirectional coupler 23. On the other hand, the reflected wave power sensor 25 measures the power of the returning wave component separated by the bidirectional coupler 23. It is preferable that the transmission lines to the progressive wave power sensor 24 and the reflected wave power sensor 25 be both in a quasi-cut-off state (for example, with an impedance of 50Ω or more and a power transmission factor of −20 dBm or less).

The power meter 26 conveys to the controller 40 the progressive wave power measured by the progressive wave power sensor 24 and the reflected wave power measured by the reflected wave power sensor 25. The controller 40 calculates the difference between the progressive wave power and the reflected wave power to thereby calculate the electric power actually injected into the DUT 10, and records the calculated result. In this way, the electric power injected into the DUT 10 is measured by the power meter 26 which is located far away from the DUT 10. Accordingly, for high-accuracy measurement of the electric power injected into the DUT 10, it is preferable that the cable loss during transmission of the high-frequency noise signal be reduced to as low a value as possible (for example, 1 dB or less).

The detector 30 monitors the output waveform of the DUT 10, and feeds the monitoring results to the controller 40. As the detector 30, an oscilloscope or the like can be used suitably. Here, to prevent the presence of the detector 30 from affecting the electric component BCI test, it is preferable that the transmission line from the DUT 10 to the detector 30 be kept in a quasi-cut-off state by use of a differential probe with a high input impedance (1 MΩ) combined with a wide band (3 GHz).

The controller 40 is the principal component in controlling the electric component BCI test. In the electric component BCI test, the controller 40 controls the signal generator 21, for example, such that, while the oscillation frequency of the high-frequency noise signal injected into the DUT 10 is kept constant, the amplitude of the high-frequency noise signal (the injected electric power) is increased gradually. In parallel with this amplitude control, according to the monitoring results from the detector 30, the controller 40 checks for a malfunction of the LSI 11 (checks for occurrence of a skipped pulse in a clock signal, a fluctuation in frequency, an out-of-range output voltage, a communication error, or the like). The controller 40 then acquires the result of calculation (the electric power injected into the DUT 10) on the measured values from the power meter 26 at the point of occurrence of the malfunction of the LSI 11, and stores that in association with the currently set oscillation frequency. Thereafter, the controller 40 repeats the measurements described above while sweeping the oscillation frequency of the high-frequency noise signal, and thereby determines a malfunctioning power-frequency response in which the oscillation frequency of the high-frequency noise signal is correlated with the injected electric power that causes the malfunction. As the controller 40, a personal computer or the like that can perform the measurements described above sequentially can be used suitably.

The battery 50 is a direct-current power source that supplies the DUT 10 with electric power. For example, in a case where a vehicle-mounted LSI is the evaluation target, a vehicle-mounted battery is used as the battery 50. However, the direct-current power source for the DUT 10 is not limited to a battery, and instead, for example, an AC-DC converter that generates a desired direct-current electric power from commercial alternating-current electric power may be used.

The power filter 60 is a circuit for keeping the transmission line from the noise source 20 to the battery 50 in a quasi-cut-off state, and includes power impedance stabilizing networks 61 and 62 (hereinafter referred to as LISNs (line impedance stabilization networks) 61 and 62. The LISNs 61 and 62 both serve to stabilize the apparent impedance of the battery 50. The LISN 61 is inserted in a power line that connects between the positive terminal (+) of the battery 50 and the power terminal (VCC) of the DUT 10, and the LISN 62 is inserted in a ground (GND) line that connects between the negative terminal (−) of the battery 50 and the GND terminal (VEE) of the DUT 10.

The wire harness 70 is an electric conductor member with a length of about 1.5 to 2.0 m that electrically connects between the DUT 10 and the power filter 60. The wire harness 70 may comprise a single wire or a plurality of wires bundled together. The wire harness 70 is, at a predetermined position along it, fitted with an injection probe (injection transformer) 80 so as to be injected with a bulk current across the 50Ω transmission line 28 of the noise source 20.

In the electric component BCI test, the total length of the wire harness 70 is restricted to 1700 mm to 2000 mm. Also, the position at which to fit the injection probe 80 (that is, the distance between the DUT 10 and the injection probe 80) is restricted to three positions: 150 mm, 450 mm, and 750 mm.

Figure 3:
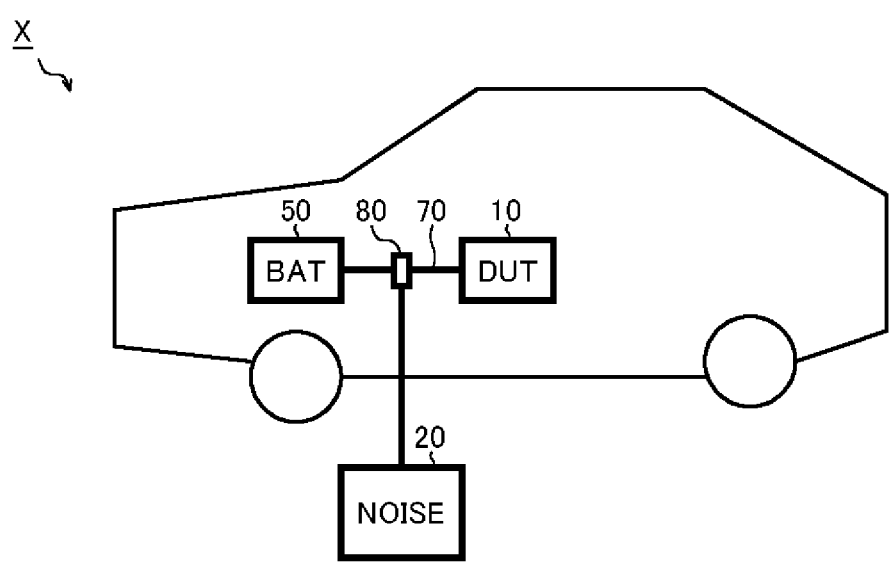
FIG. 3 is a block diagram showing an example of a vehicle BCI test.

Vehicle BCI Test (ISO 11451-4):

FIG. 3 is a block diagram showing an example of a BCI test for a vehicle. A vehicle BCI test is a BCI test that is performed on a vehicle X in a state having the DUT 10, the wire harness 70, and the like described above mounted on it, and conforms to ISO 11451-4.

Figure 4:
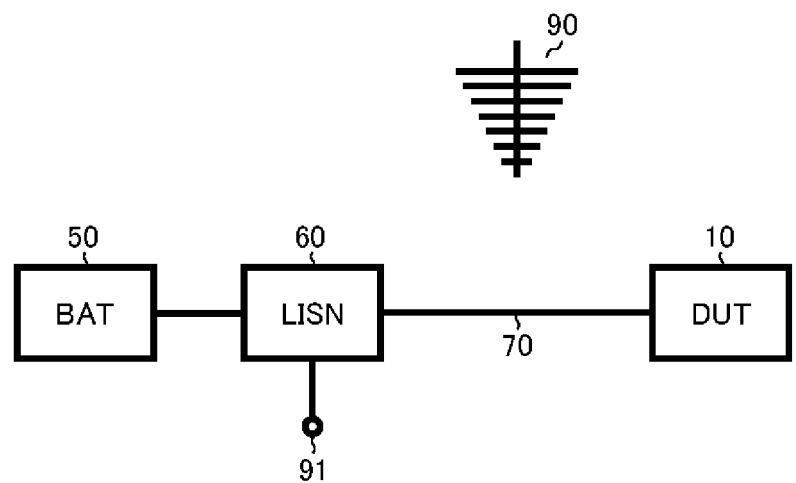
FIG. 4 is a block diagram showing an example of an electric component emission test.

Electric Component Emission Test (CISPR 25):

FIG. 4 is a block diagram showing one example of an emission test for an electric component. The electric component emission test shown there is a measurement bench mark for evaluating the emission characteristics of the electric component, and conforms to the CISPR 25 standard formulated by International Special Committee on Radio Interference (CISPR), "Restrictions and methods of measurement of radio disturbance characteristics for the protection of receivers used on board vehicles." A electric component emission test divides into radiated emission measurement and conducted emission measurement. In radiated emission measurement, the strength of the noise radiated from the wire harness 70 is measured with an antenna 90. On the other hand, in conducted emission measurement, a terminal 91 (not used in an immunity test) of the power filter 60 is used to measure the strength of the noise conducted across the wire harness 70. Thus, in that it involves measurement of the strength of noise, the electric component emission test differs in configuration and purpose from the electric component BCI test (FIG. 2) and the vehicle BCI test (FIG. 3) described previously. However, also in the electric component emission test, the total length of the wire harness 70 is restricted, and in this respect, it is no different from the electric component BCI test (FIG. 2).

Figure 5:
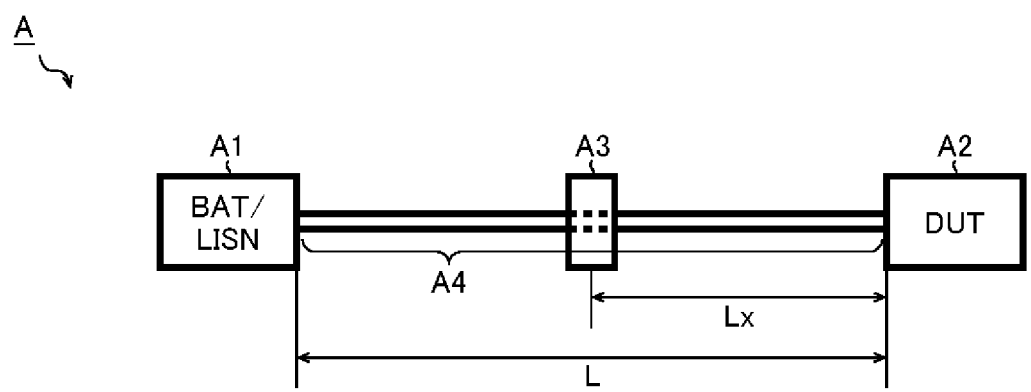
FIG. 5 is a block diagram showing an example of a simulation model.

Simulation Model: FIG. 5 is a block diagram showing one example of a simulation model. The simulation model A of this configuration example models an entire measurement bench mark (the electric component BCI test in FIG. 2), and is composed of a combination of a battery/LISN model A1, a DUT model A2, a BCI injection probe model A3, and a wire harness model A4.

The battery/LISN model A1 models the battery 50 and the power filter 60. In a case where not only the battery 50 and the power filter 60 but a control system is connected, a control system model can be added in parallel with the battery/LISN model A1.

The DUT model A2 models the DUT 10. The DUT model A2 includes an LSI model, which models the LSI 11, a PCB model, which models the PCB, an immunity behavior model, which represents their immunity behavior, and the like.

The BCI injection probe model A3 models the injection probe 80.

The wire harness model A4 models the wire harness 70. The wire harness model A4 includes, as parameters representing its transmission characteristics, a parameter L commensurate with the total length of the wire harness 70 and a parameter Lx commensurate with the distance between the DUT 10 and the injection probe 80 (which can be read as the noise injection position) (a detailed description will be given later).

When a wire harness structure for an electric component BCI test is modeled as it is, the values of the parameters L and Lx mentioned above are so restricted as to reflect the restriction on the total length of the wire harness 70 (1700 to 2000 mm) and the restriction on the position of the injection probe 80 (positions at the distances of 150 mm, 450 mm, and 750 mm from the DUT 10).

Figure 6:
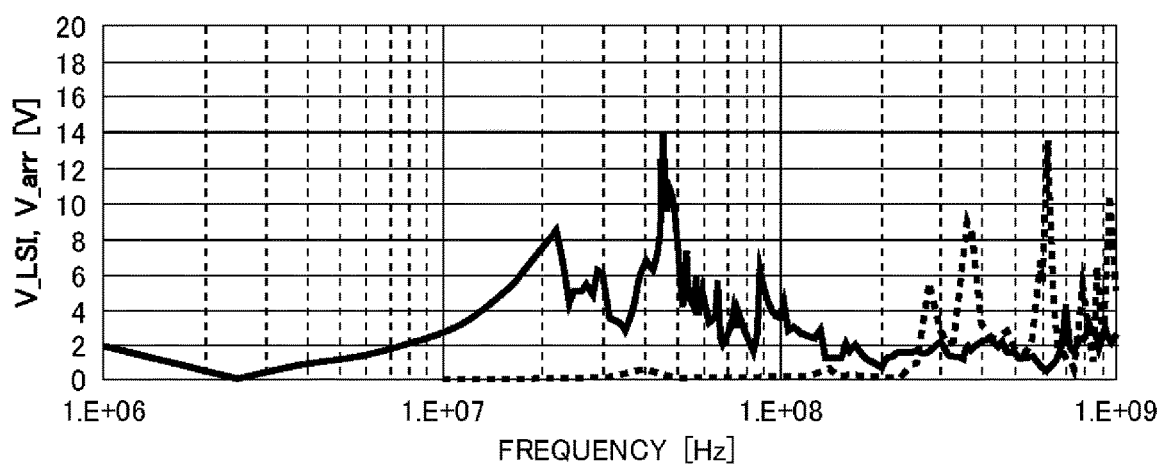
FIG. 6 is a diagram showing an example of comparison between a malfunctioning voltage-frequency response and an arriving voltage-frequency response.

Method for Evaluation of Immunity Characteristics:

FIG. 6 is a diagram showing an example of comparison between a malfunctioning voltage-frequency response (solid line) and an arriving voltage-frequency response (broken line).

The malfunctioning voltage-frequency response represents the magnitude of the high-frequency noise signal at the limit beyond which the LSI 11 malfunctions as represented in terms of a terminal voltage V LSI which appears between predetermined points in the LSI 11. The malfunctioning voltage-frequency response can be determined from the malfunctioning power-frequency response obtained in a DPI (direct power injection) test (that is, the magnitude of the high-frequency noise signal at the limit beyond which the DUT 10 malfunctions as represented in terms of the electric power injected into the DUT 10). On the other hand, the arriving voltage-frequency response is the frequency response of an arriving voltage V_arr which arrives and appears between predetermined points in the LSI 11 in an electric component BCI test (or in computer simulation that simulates one).

By comparing the malfunctioning voltage-frequency response and the arriving voltage-frequency response mentioned above, it is possible to evaluate the immunity characteristics of the LSI 11. For example, based on FIG. 6, it can be judged that, at oscillation frequencies at which the broken line falls above the solid line, the LSI 11 can malfunction. Moreover, by performing comparison similar to that described above for every terminal of the LSI 11, it is possible to identify a terminal that is prone to be involved in malfunctioning, and thus to improve the circuit design promptly.

Although FIG. 6 deals with an example of comparison between a malfunctioning voltage-frequency response and an arriving voltage-frequency response in explanation of a method for evaluating immunity characteristics, it is also possible to evaluate the immunity characteristics of the LSI 11, for example, by performing comparison between a malfunctioning current-frequency response (the magnitude of the high-frequency noise signal at the limit beyond which the LSI 11 malfunctions as represented in terms of a terminal current I_LSI which passes at a predetermined part in the LSI 11) and an arriving current-frequency response (the frequency response of an arriving current I_arr which arrives and passes at a predetermined part in the LSI 11 in an electric component BCI test).

Wire Harness Model:

Next, a proposal will be presented on reviewing the simulation model of a wire harness used in the electric component BCI test (FIG. 2) and in the electric component emission test (FIG. 4). More particularly, the following proposal relates to modeling the common mode impedance of a wire harness. More specifically, proposed below will be a transmission line model that allows standardization of methods for laying wires when a plurality of wires are bundled to form a wire harness and that allows fast processing in accordance with actual wire harness structures.

Figure 7:
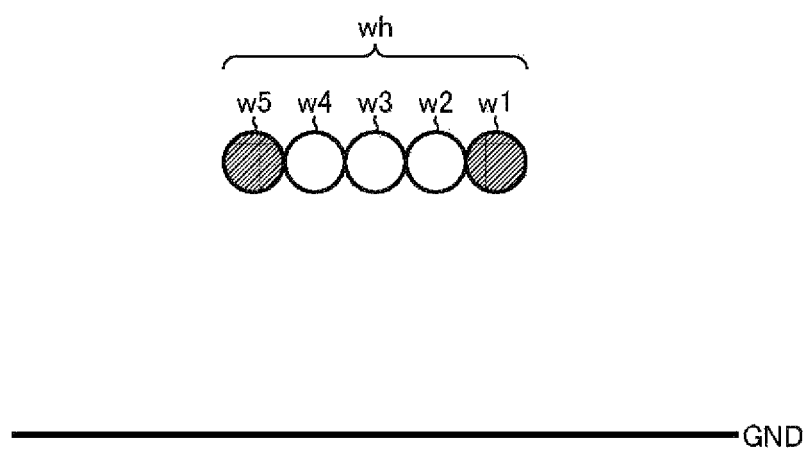
FIG. 7 is a sectional view schematically showing an example of how a wire harness is laid.

FIG. 7 is a sectional view schematically showing an example of how a wire harness is laid. In the example shown there, the wire harness wh comprises a bundle of five wires w1 to w5. The wires w1 to w5 are characterized by being laid horizontally with their coverings in contact with each other. All the wires w1 to w5 are laid at a predetermined distance (for example, 50 mm) from a ground plane (for example, a copper plate on a table). A layout like this is herein referred to as "parallel layout." It is assumed that, as the number of wires laid increases, an increased number of wires are laid next to each other in the horizontal direction.

In the example shown in FIG. 7, the wires w1 and w5 indicated by hatched circles correspond to end lines, and the wires w2 to w4 indicated by hollow circles correspond to middle lines. An end line denotes, of a plurality of wires laid in parallel, one which has no wire next to it at least on one side. On the other hand, a middle line denotes a wire which has wires next to it at both sides. There is no restriction on the number of wires laid in parallel.

The transmission characteristics of a wire harness depend on the ground (GND; such as a ground plane) that is present opposite it. As to the position of a wire harness relative to GND, they are closest together when in contact with each other, and they are farthest apart when located at infinity relative to each other. Discussed in detail below will be differences in transmission characteristics between an end line and a middle line (that is, laid position dependence of transmission characteristics).

Figure 8:
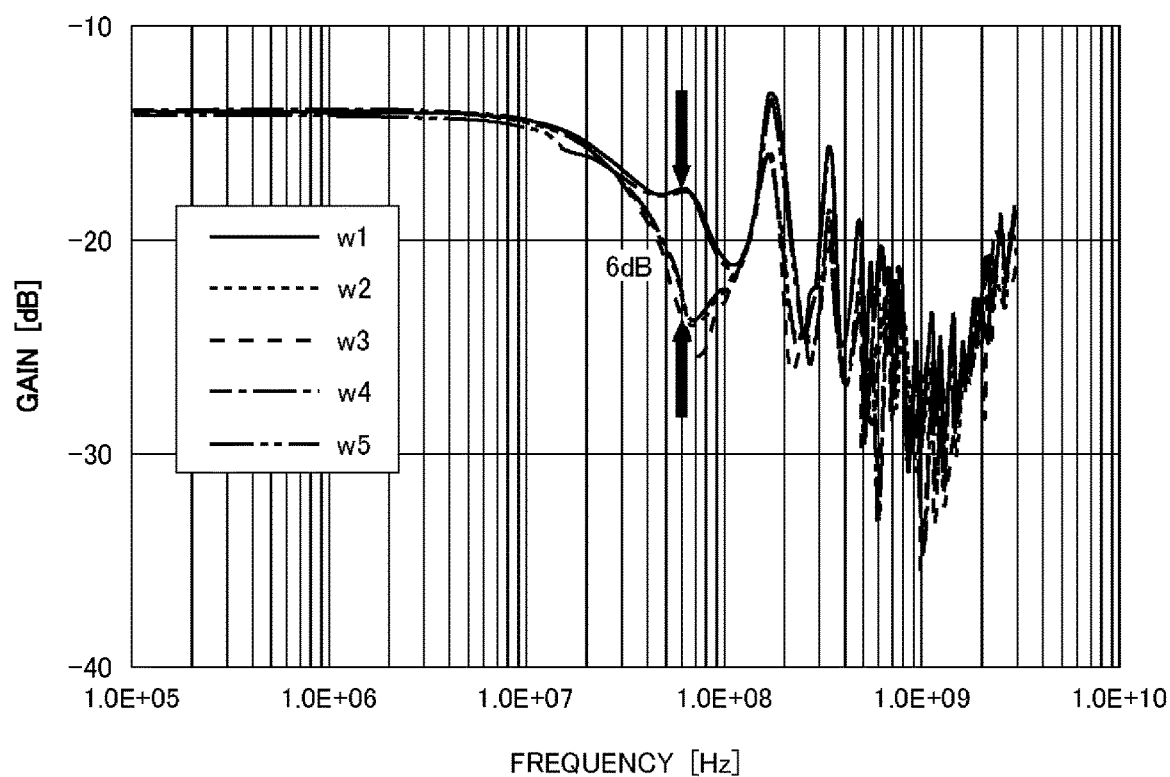
FIG. 8 is a frequency-gain diagram showing laid position dependence of transmission characteristics.

FIG. 8 is a frequency-gain diagram showing the laid position dependence of the transmission characteristics of each of the wires w1 to w5. The diagram shows the measured values actually obtained in a measurement environment where, with five wires w1 to w5 laid in parallel, while their respective first ends were short-circuited together, their respective second ends were each given a 250Ω termination structure and later, only for the wire that is the measurement target, the terminating resistor was replaced with a 200Ω terminating resistor. Needless to say, used as the wires w1 to w5 were those which had approximately the same impedance in a DC basis.

For example, comparing the transmission characteristics of the wire w1 (solid line) with the transmission characteristics of the wire w2 (fine broken line) reveals differences in transmission characteristics in a frequency band of 40 MHz to 100 MHz, in particular a difference of 6 dB (about four times) at 61 MHz (as indicated by thick arrows in FIG. 8). These differences indicate that, when the wire harness wh is subjected to disturbing noise, the disturbing energy does not uniformly propagate across the wires w1 and w2.

On the other hand, between the transmission characteristics of the wire w1 (solid line) and the transmission characteristics of the wire w5 (dash-dot-dot line), no significant differences are observed in the frequency band mentioned above. Likewise, among the transmission characteristics of the wire w2 (fine broken line), the transmission characteristics of the wire w3 (coarse broken line), and the transmission characteristics of the wire w4 (dash-dot line), no significant differences are observed in the frequency band mentioned above.

In view of the measured values above, the present inventor, paying attention to the fact that the characteristic impedances of the wires w1 to w5 in a parallel layout tend to reflect their respective laid states (neighboring states), has found out that the wires w1 to w5 can be classified into two types, namely a group of end lines (w1 and w5) and a group of middle lines (w2 to w4).

In conventional wire harness models, for simplicity's sake, the interaction among wires laid next to each other is ignored, and the wires are expressed uniformly as having a single characteristic impedance. Thus, in conventional wire harness models, the same current and the same voltage are assumed to be present in all of the wires w1 to w5 with the same terminating condition, making it impossible to express differences reflecting different laid states. Moreover, with a lumped parameter, the absence of reflection makes it impossible to express a standing wave, which depends on the total length of a wire harness wh.

On the other hand, classifying a wire harness wh into at least a group of end lines (w1 and w5) and a group of middle lines (w2 to w4) makes it possible to reproduce transmission characteristics that conventionally cannot be expressed with a conventional wire harness model having a single characteristic impedance or with a lumped parameter.

Figure 9A:
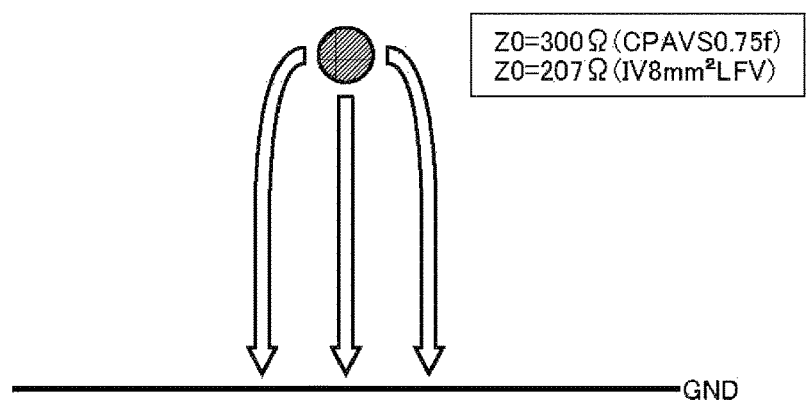
FIG. 9A is a schematic diagram schematically showing a single-line model.
Figure 9B:
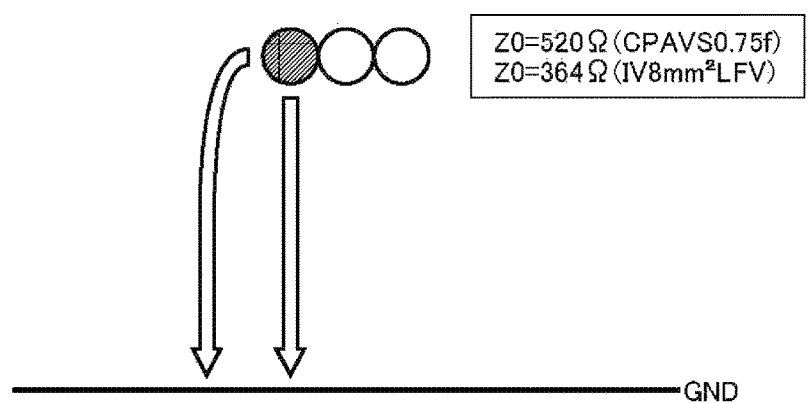
FIG. 9B is a schematic diagram schematically showing an end-line model.
Figure 9C:
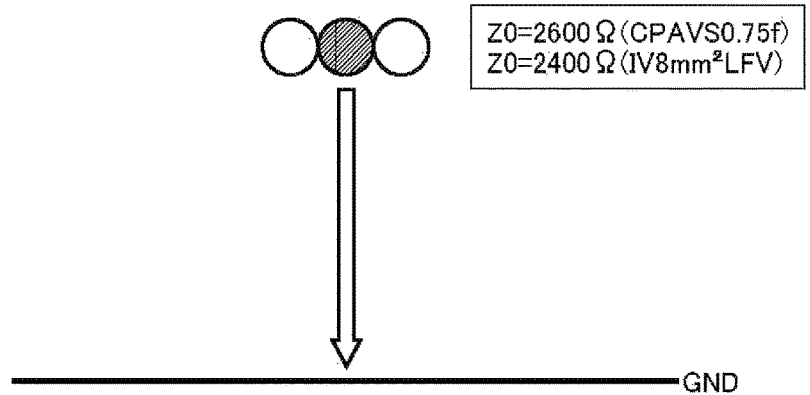
FIG. 9C is a schematic diagram schematically showing a middle-line model.

Model Classification:

FIGS. 9A to 9C are each a sectional view schematically showing a wire harness, where the wire indicated by a hatched circle is modeled as a single-line model (FIG. 9A), an end-line model (FIG. 8B), and a middle-line model (FIG. 9C). In each diagram, the bottom line corresponds to a ground plane.

The single-line model (FIG. 9A) models a wire that has no other wire on either side of it (that is, a single line). Thus, the single-line model (FIG. 9A) does not count among examples where a plurality of wires are laid in parallel; nevertheless, it will be described as a basic unit of transmission line models along with the end-line model (FIG. 9B) and the middle-line model (FIG. 9C). The single-line model (FIG. 9A) can be understood as a special example of the end-line model (FIG. 8B).

In the diagrams, hollow arrows each depict a representative line of electric force. As will be understood from comparison of the diagrams, different laid states of the wires produce different electric field distributions, and thus three types of characteristic impedances (for single-line, end-line, and middle-line models) exist mixedly. Each diagram takes two types of wires (CPAVS 0.75 f and IV 8 mm² LFV) as examples, and accordingly, for each model, two types of characteristic impedances Z0 are given.

In the single-line model (FIG. 9A), with CPAVS 0.75 f, Z0=300Ω, and with IV 8 mm² LFV, Z0=207Ω. In the end-line model (FIG. 9B), with CPAVS 0.75 f, Z0=520Ω, and with IV 8 mm² LFV, Z0=364Ω. In the middle-line model (FIG. 9C), with CPAVS 0.75 f, Z0=2600Ω, and with IV 8 mm² LFV, Z0=2400Ω.

Thus, it is seen that, between, at one end, the single-line model (FIG. 9A) and the end-line model (FIG. 9B) and, at the other end, the middle-line model (FIG. 9C), the value of the characteristic impedance Z0 differs by one order of magnitude.

Figure 10:
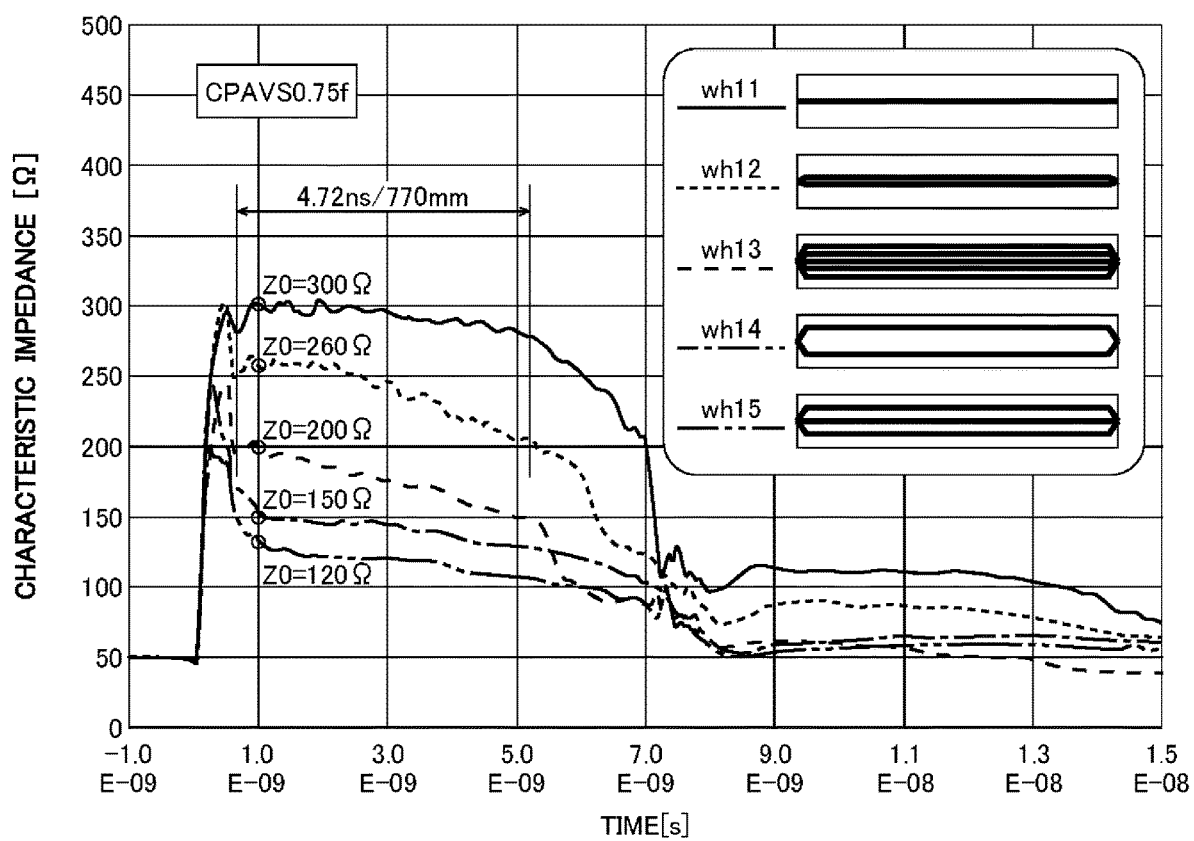
FIG. 10 is a measured waveform diagram of characteristic impedance (CPAVS 0.75 f)

FIG. 10 is a measured waveform diagram actually acquired when the characteristic impedance of CPAVS 0.75 f was derived. The layouts of wire harnesses wh11 to wh15 that were used in the measurement of the characteristic impedance were, as shown in the legend box, as follows: wh11 (solid line) had a single line; wh12 (fine broken line) had two wires laid in parallel; wh13 (coarse broken line) had five wires laid in parallel; wh14 (dash-dot line) had two wires laid in parallel (with a wire-to-wire distance of 100 mm); and wh15 (dash-dot-dot line) had three wires laid in parallel (with a wire-to-wire distance of 50 mm).

As the method for measuring the characteristic impedance, TDR (time domain reflectometry) was performed using an analyzer "Agilent 8510C" (incorporating IFFT (inverse fast Fourier transform), in a measurement band of 45 MHz to 18.045 GHz, at 401 measurement points, and in a measurement range of −1 ns to 15 ns. In the measurement of the characteristic impedance, all wires were short-circuited together at each end, and the characteristic impedance was acquired as the common mode impedance of the straight part of the harness.

The measurement result with the wire harness wh1 (solid line) was Z0=300Ω. The wire harness wh11 can be understood as a single line as it is. Accordingly, the characteristic impedance of the single-line model can be set at "300Ω" (see FIG. 9A).

The measurement result with the wire harness wh12 (fine broken line) was Z0=260Ω. The wire harness wh12 can be understood as two end lines laid in parallel. Accordingly, the characteristic impedance of the end-line model can be set at "520Ω (=260Ω×2)" (see FIG. 9B).

The measurement result with the wire harness wh13 (coarse broken line) was Z0=200Ω. The wire harness wh13 can be understood as two end lines and three middle lines laid in parallel. Accordingly, when the characteristic impedance of the middle-line model is represented by R, then formula (1) below holds.

$$1/200 = 2/520 + 3/R \quad (1)$$

By solving formula (1), the characteristic impedance of the middle-line model can be determined as "2600Ω" (see FIG. 9C).

The measurement result with the wire harness wh14 (dash-dot line) was Z0=150Ω. The measurement result with the wire harness wh15 (dash-dot-dot line) was Z0=120Ω. Through comparison of these measurement results with the measurement result of the wire harness wh11 (Z0=300Ω; solid line), it was observed that, with a wire-to-wire distance of 100 mm or more, each of wires laid in parallel exhibited transmission characteristics similar to those of a single line.

Moreover, in the measurement with all of the wire harnesses wh11 to wh15, a delay time of 4.72 ns/770 mm was observed. Thus, the unit delay time per unit length (1 m) can be determined as "6.13 ns/m."

Figure 11:
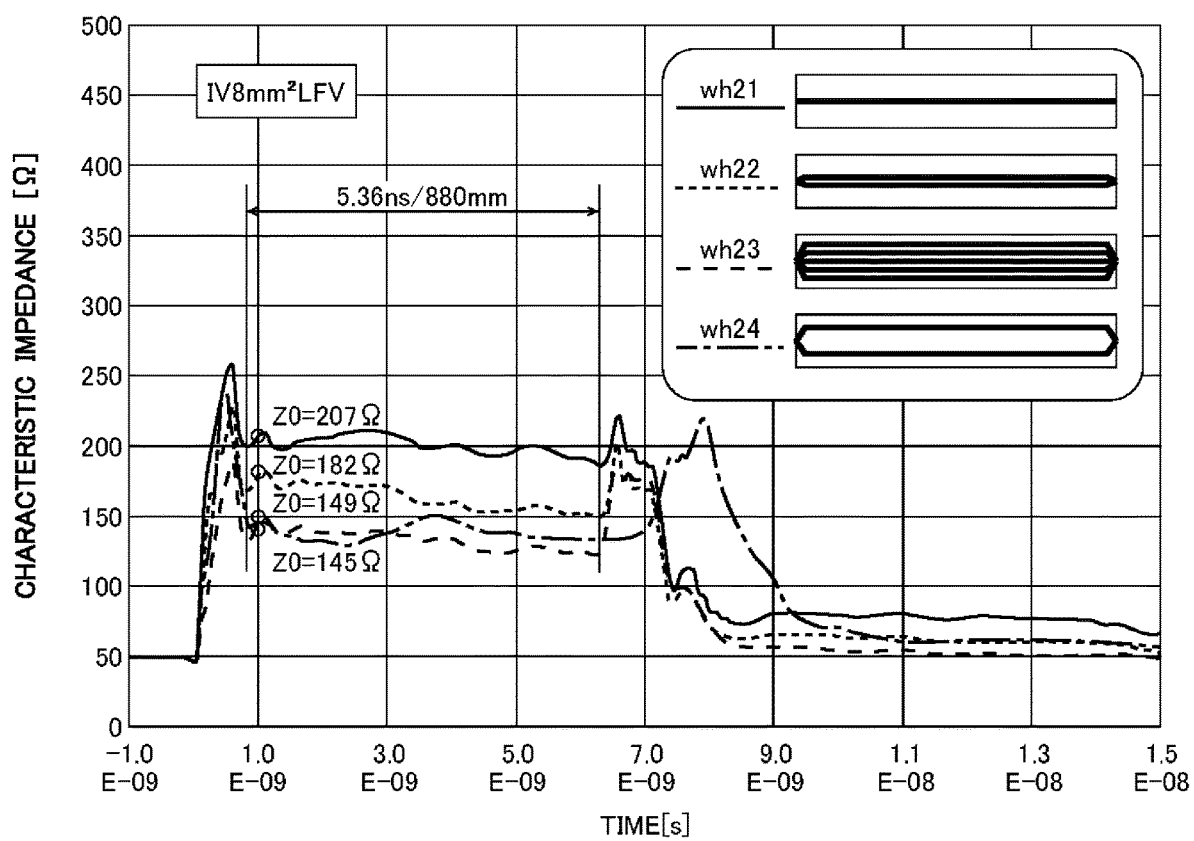
FIG. 11 is a measured waveform diagram of characteristic impedance (IV 8 mm$^2$ LFV)

FIG. 11 is a measured waveform diagram actually acquired when the characteristic impedance of IV 8 mm² LFV was derived. The layouts of the wire harnesses wh21 to wh24 that were used in the measurement of the characteristic impedance were, as shown in the legend box, as follows: wh21 (solid line) had a single line; wh22 (fine broken line) had two wires laid in parallel; wh23 (coarse broken line) had five wires laid in parallel; and wh24 (dash-dot line) had two wires laid in parallel (with a wire-to-wire distance of 100 mm). The method for measuring the characteristic impedance, the analyzer, the measurement band, the number of measurement points, and the measurement range were the same as mentioned above in connection with FIG. 10.

The measurement result with the wire harness wh21 (solid line) was Z0=207Ω. The wire harness wh21 can be understood as a single line as it is. Accordingly, the characteristic impedance of the single-line model can be set at "207Ω" (see FIG. 9A).

The measurement result with the wire harness wh22 (fine broken line) was Z0=182Ω. The wire harness wh22 can be understood as two end lines laid in parallel. Accordingly, the characteristic impedance of the end-line model can be set at "364Ω (=182Ω×2)" (see FIG. 9B).

The measurement result with the wire harness wh23 (coarse broken line) was Z0=149Ω. The wire harness wh23 can be understood as two end lines and three middle lines laid in parallel. Accordingly, when the characteristic impedance of the middle-line model is represented by R, then formula (2) below holds.

$$1/149 = 2/364 + 3/R \quad (2)$$

By solving formula (2), the characteristic impedance of the middle-line model can be determined as "2400Ω" (see FIG. 9C).

The measurement result with the wire harness wh24 (dash-dot line) was Z0=145Ω. Through comparison of this measurement result with the measurement result with the wire harness 21 (Z0=207Ω; solid line), it was observed that interference occurred among the wires laid in parallel.

Moreover, in the measurement with all of the wire harnesses wh21 to wh24, a delay time of 5.36 ns/880 mm was observed. Thus, the unit delay time per unit length (1 m) can be determined as "6.09 ns/m."

Transmission Line Model:

Based on the measurement results presented above, transmission line models (for example, SPICE models) for wires will be proposed. FIG. 12 is a table showing the values of parameters in those transmission line models, giving the characteristic impedance and the unit delay time for different types of wires (CPAVS 0.75 f and IV 8 mm² LFV) and different models (single-line, end-line, and middle-line models).

Although, here, different types of wires (different types of transmission lines) are exemplified by, as a low-voltage transmission line (signal line), CPAVS 0.75 f and, as a high-voltage transmission line, IV 8 mm² LFV, any other type of wire may be modeled.

In the single-line model with CPAVS 0.75 f, the characteristic impedance is set at Z0=300 [Ω], and the unit delay time is set at TD=6.13 [ns/m]. In the end-line model with CPAVS 0.75 f, the characteristic impedance is set at Z0=520 [Ω], and the unit delay time is set at TD=6.13 [ns/m]. In the middle-line model with CPAVS 0.75 f, the characteristic impedance is set at Z0=2600 [Ω], and the unit delay time is set at TD=6.13 [ns/m].

On the other hand, in the single-line model with IV 8 mm² LFV, the characteristic impedance is set at Z0=207 [Ω], and the unit delay time is set at TD=6.09 [ns/m]. In the end-line model with IV 8 mm² LFV, the characteristic impedance is set at Z0=364 [Ω], and the unit delay time is set at TD=6.09 [ns/m]. In the middle-line model with IV 8 mm² LFV, the characteristic impedance is set at Z0=2400 [Ω], and the unit delay time is set at TD=6.09 [ns/m].

As described above, the characteristic impedance of each model is set at a different value according to the model classification of wires (single-line, end-line, or middle-line model). In particular, with attention focused on an end-line model and a middle-line model, the characteristic impedance of the end-line model is set at a value about one order of magnitude lower that the characteristic impedance of the middle-line model. On the other hand, as for the unit delay time of each model, it is set at the same value irrespective of the model classification of wires. Moreover, the characteristic impedance and the unit delay time are set separately for different types of wires.

Figure 13:
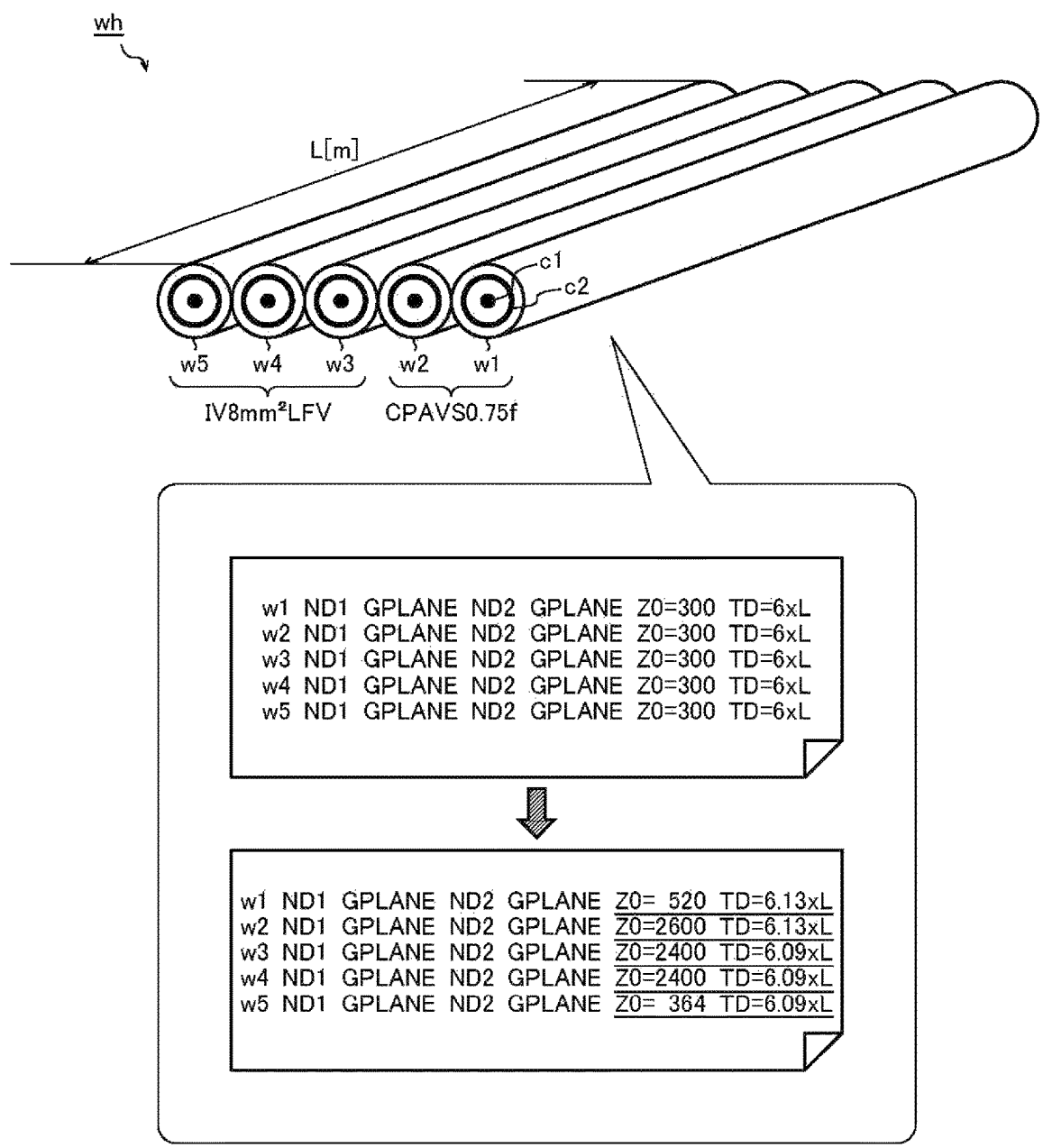
FIG. 13 is a schematic diagram showing examples of descriptions of transmission line models.

FIG. 13 is a schematic diagram showing examples of descriptions of transmission line models. In the example shown there, the wire harness has five wires w1 to w5 laid in parallel, and has a total length of L [m]. As to wire types, it is assumed that the wires w1 and w2 are CPAVS 0.75 f and that the wires w3 to w5 are IV 8 mm² LFV.

On the other hand, with attention focused on the laid states of the wires w1 to w5, the wires w1 and w5 are classified as end lines and the wires w2 to w4 are classified as middle lines. Thus, the wire harness wh can be expressed appropriately as a combination of an end-line model and a middle-line model.

Here, it is assumed that a transmission line model is described by a sequence of parameters stated in the following order: wire number (name); connection destination of the first port of the inner conductor c1; connection destination of the first port of the outer conductor c2; connection destination of the second port of the inner conductor c1; connection destination of the second port of the outer conductor c2; characteristic impedance Z0; and delay time TD (=unit delay time×total length).

For example, the sequence "w1 ND1 GPLANE ND2 GPLANE Z0=300 TD=6×L" on the first line in the upper block in the balloon can be interpreted as indicating "as for the wire w1, the connection destination of the first port of the inner conductor c1 is a node ND1; the connection destination of the first port of the outer conductor c2 is the ground plane; the connection destination of the second port of the inner conductor c1 is a node ND2; the connection destination of the second port of the outer conductor c2 is the ground plane; the characteristic impedance Z0 is 300 [Ω]; and the delay time TD is 6×L [ns]."

Given in the upper block in the balloon is a description of a conventional transmission line model where the wires w1 to w5 are represented by a single characteristic impedance (Z0=300 [Ω]). On the other hand, given in the lower block in the balloon is a description of a novel transmission line model where the wires w1 to w5 are represented by different characteristic impedances according to their respective laid states.

More specifically, the wire w1 is modeled as an end-line model with CPAVS 0.75 f (Z0=520 [Ω], TD=6.13×L [ns]). The wire w2 is modeled as a middle-line model with CPAVS 0.75 f (Z0=2600 [Ω], TD=6.13×L [ns]). The wires w3 and w4 are both modeled as a middle-line model with IV 8 mm² LFV (Z0=2400 [Ω], TD=6.09×L [ns]). The wire w5 is modeled as an end-line model with IV 8 mm² LFV (Z0=364 [Ω], TD=6.09×L [ns]).

Thus, the novel transmission line model proposed herein is produced through: a step of classifying wires which are the target of modeling into two types of wires, i.e., end lines and middle lines, (or three types of wires further including a single line); and a step of modeling the two types of wires, i.e., end lines and middle lines, (or the three types of wires further including a single line) separately to produce two types of models, i.e., an end-line model and a middle-line model, (or three types of models further including a single-line model).

With a transmission line model like this, unlike conventional transmission line models, it is possible to faithfully reproduce differences in transmission characteristics (see FIG. 8) arising from different laid states of wires, and thus to reduce deviations between measured values and simulated values.

Moreover, the novel transmission line model proposed herein includes, as parameters representing its transmission characteristics, the characteristic impedance Z0 and the delay time TD, and is in this respect no different from conventional transmission line models (compare the upper and lower blocks in the balloon in FIG. 13). Thus, it does not greatly affect the preparation time and execution time of EMC computer simulation.

Methods for expressing transmission line models roughly divide into those giving consideration to loss (loss-inclusive) and those giving no consideration to loss (loss-exclusive). The former vary greatly in the method for expressing the loss. The total length of the wire harness used in the electric component BCI test (FIG. 2) and the electric component emission test (FIG. 4) described previously is about 2 m, and even when consideration is given to its mounting on a vehicle, its total length is about 10 m. In view of this, it is preferable to use whichever suits the purpose of a loss-inclusive transmission line model and a loss-exclusive transmission line model. Incidentally, the characteristic impedances and the unit delay times mentioned above are all examples of loss-exclusive values.

Figure 14:
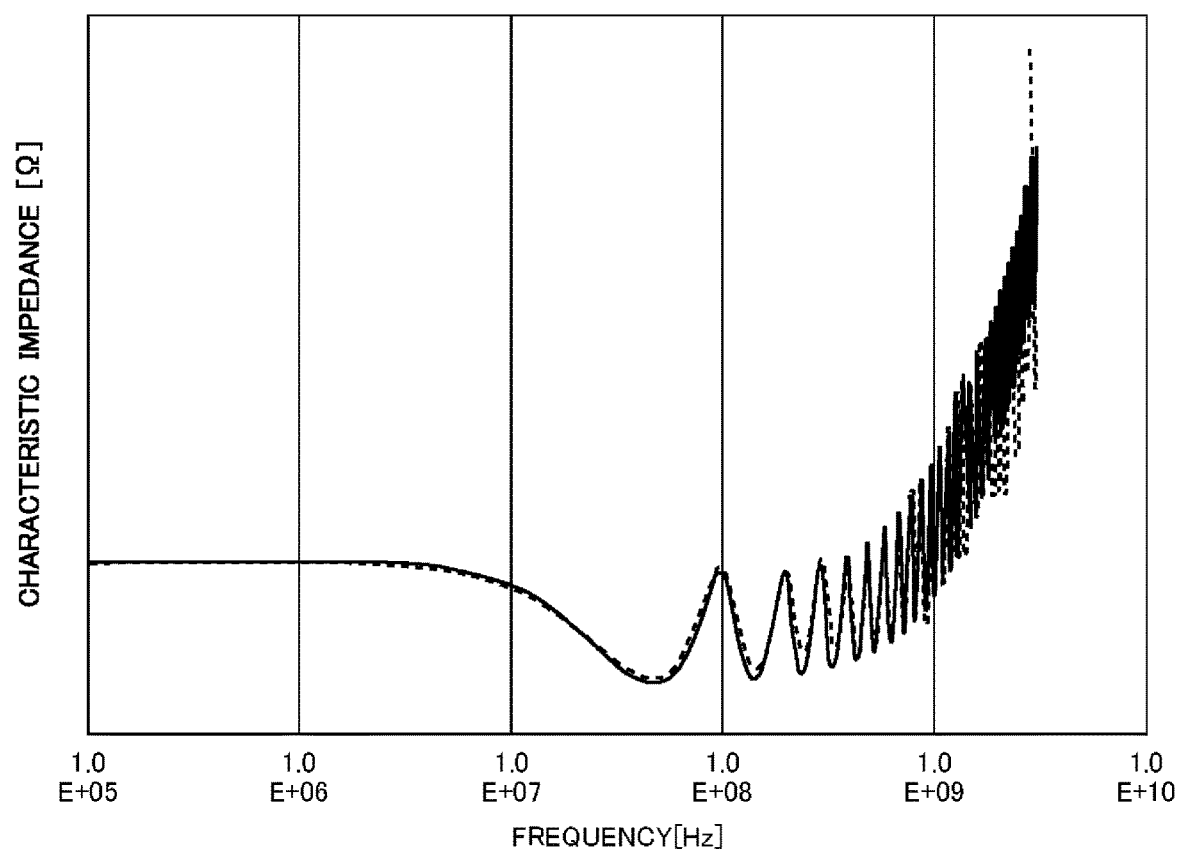
FIG. 14 is a frequency-characteristic impedance diagram showing an example of reproduction through simulation.

FIG. 14 is a frequency-characteristic impedance diagram showing an example of observed reproduction by transmission line simulation. In the figure, the solid line represents the simulated value (with loss taken into consideration), and the broken line represents the measured value. From the diagram, it is seen that the behavior of the solid line accurately matches the behavior of the broken line. For example, with a transmission line model that gives consideration to, as loss, the electric power that turns into heat and the electric power that dissipates by radiation, the amount of radiation can be calculated.

Application to Vehicle Body Test:

In the electric component BCI test (FIG. 2) described previously, to ensure its practicability, one out of a great variety of wire harness structures (there are as many as the number of vehicles) is fixed, and in addition the noise injection points are restricted to three discrete points.

However, wire harnesses that are laid on actual vehicles come in a variety, having varying total lengths of 100 mm to 2000 mm and varying numbers of wires from one to about sixty. Accordingly, there are a huge number of phenomena that cannot be predicted in electric component BCI tests, many of them practically being left overlooked.

By contrast, according to a computer simulation method proposed herein, parameters (for example, characteristic impedance, delay time, and number of wires laid) of a transmission line model that models a wire harness are left variable, and while those parameters are swept within predetermined ranges, the immunity characteristics or emission characteristics of a DUT is evaluated.

First, by way of some specific examples of how parameters are changed, how the description of a transmission line model changes will be described.

Figure 15:
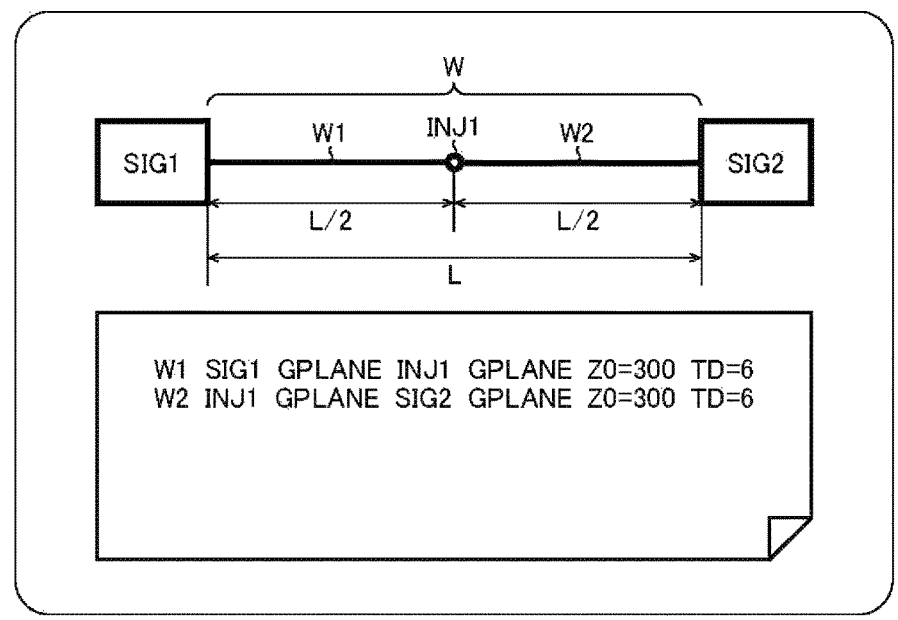
FIG. 15 is a schematic diagram showing an example of changing a description of a transmission line model (when the number of noise injection points is increased)
Figure 15:
Figure 15:
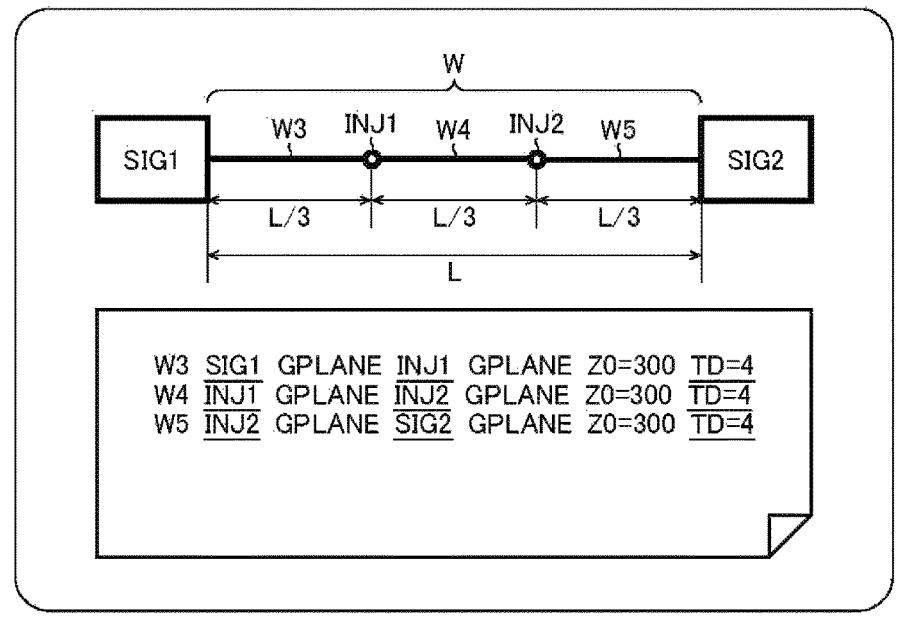

FIG. 15 is a schematic diagram showing how the description of a transmission line model has to be changed when the number of noise injection points is increased from one to two.

In a case where, as shown in the upper block of FIG. 15, a noise injection point INJ1 is fitted at one place on a wire W (with a total length L) laid between a signal node SIG1 and a signal node SIG2 (in the illustrated example, at the point that divides the wire W into two equal parts), the part laid between the signal node SIG1 and the noise injection point INJ1 is understood as a divisional wire W1 (with a length L/2), and the part laid between the noise injection point INJ1 and the signal node SIG2 is understood as a divisional wire W2 (with a length L/2); thus, a transmission line model can be described, for example, as noted below.

W1 SIG1 GPLANE INJ1 GPLANE Z0=300 TD=6
W2 INJ1 GPLANE SIG2 GPLANE Z0=300 TD=6

On the other hand, in a case where, as shown in the lower block of FIG. 15, noise injection points INJ1 and INJ2 are fitted at two places on a wire W (in the illustrated example, at points that divide the wire W into three equal parts), the part laid between the signal node SIG1 and the noise injection point INJ1 is understood as a divisional wire W3 (with a length L/3), the part laid between the noise injection point INJ1 and the noise injection point INJ2 is understood as a divisional wire W4 (with a length L/3), and the part laid between the noise injection point INJ2 and the signal node SIG2 is understood as a divisional wire W5 (with a length L/3); thus, a transmission line model can be described, for example, as noted below.

W3 SIG1 GPLANE INJ1 GPLANE Z0=300 TD=4
W4 INJ1 GPLANE INJ2 GPLANE Z0=300 TD=4
W5 INJ2 GPLANE SIG2 GPLANE Z0=300 TD=4

As described above, when the number of noise injection points is increased, the wire is divided at an increased number of places, and this can be coped with by increasing as necessary the number of lines included in the description of the transmission line model. Moreover, when the number of noise injection points is increased, the length of the divisional wires changes, and this can be coped with by changing as necessary the delay time TD in the transmission line model.

Figure 16:
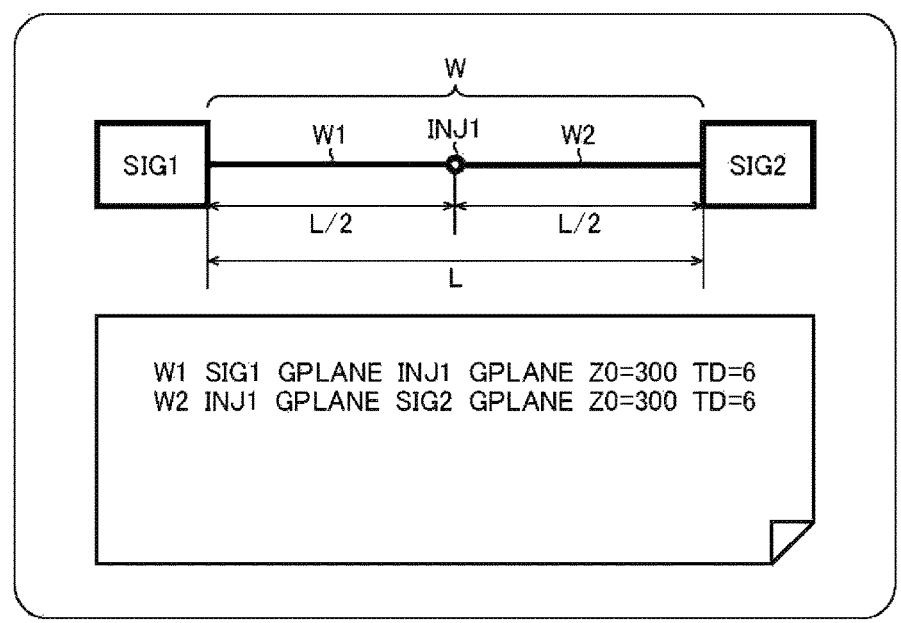
FIG. 16 is a schematic diagram showing an example of changing a description of a transmission line model (when a noise injection position is changed)
Figure 16:
Figure 16:
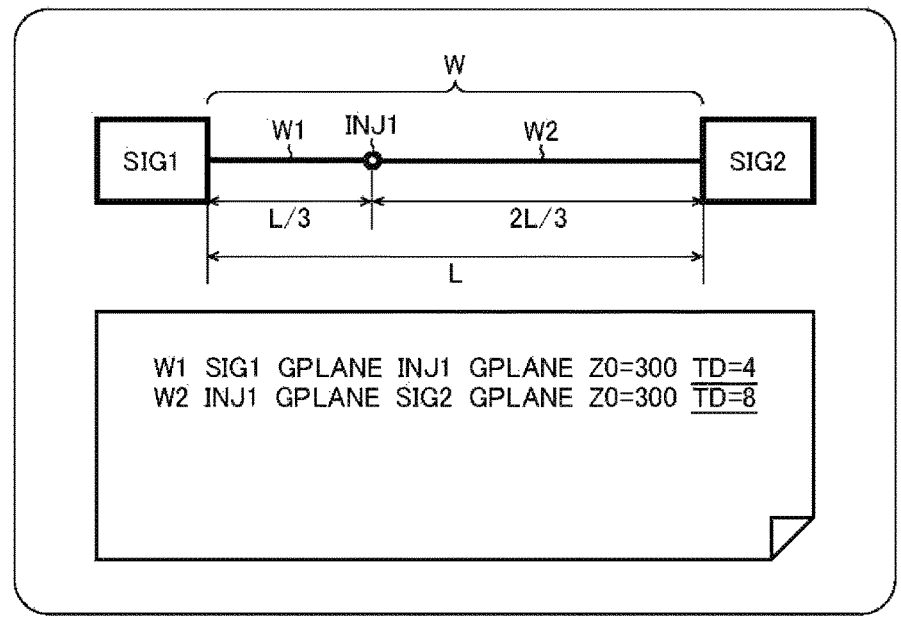

FIG. 16 is a schematic diagram showing how statements in the description of a transmission line model have to be changed when the noise injection position is changed.

In the upper block of FIG. 16, as in the upper block of FIG. 15, a noise injection point INJ1 is fitted at the point that divides a wire W (with a total length L) laid between a signal node SIG1 and a signal node SIG2 into two equal parts. Accordingly, a transmission line model can be described, for example, as noted below.

W1 SIG1 GPLANE INJ1 GPLANE Z0=300 TD=6
W2 INJ1 GPLANE SIG2 GPLANE Z0=300 TD=6

On the other hand, in the lower block of FIG. 16, a noise injection point INJ1 is provided not at the point that divides the wire W into two equal parts but at one of the points that divide the wire W into three equal parts (in the illustrated example, at the point that gives a divisional wire W1 a length L/3 and a divisional wire W2 a length 2L/3). Accordingly, a transmission line model can be described, for example, as noted below.

W1 SIG1 GPLANE INJ1 GPLANE Z0=300 TD=4
W2 INJ1 GPLANE SIG2 GPLANE Z0=300 TD=8

As described above, when the noise injection position is changed, the lengths of divisional wires change, and this can be coped with by changing as necessary the delay time TD in the transmission line model. Though not specifically illustrated, needless to say, the total length of a wire can also be coped with by changing the delay time TD.

Figure 17:
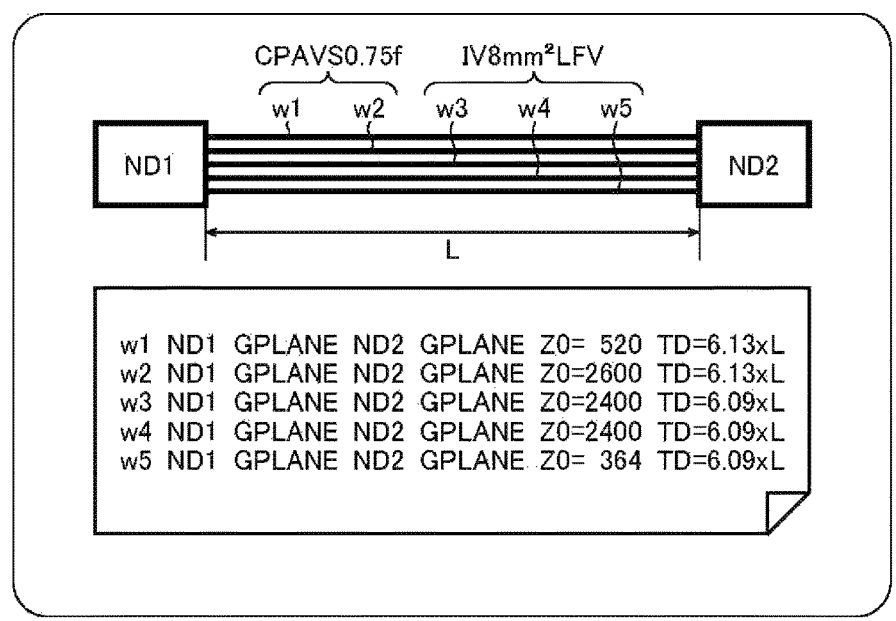
FIG. 17 is a schematic diagram showing an example of changing a description of a transmission line model (when wires' laid states are changed)
Figure 17:
Figure 17:
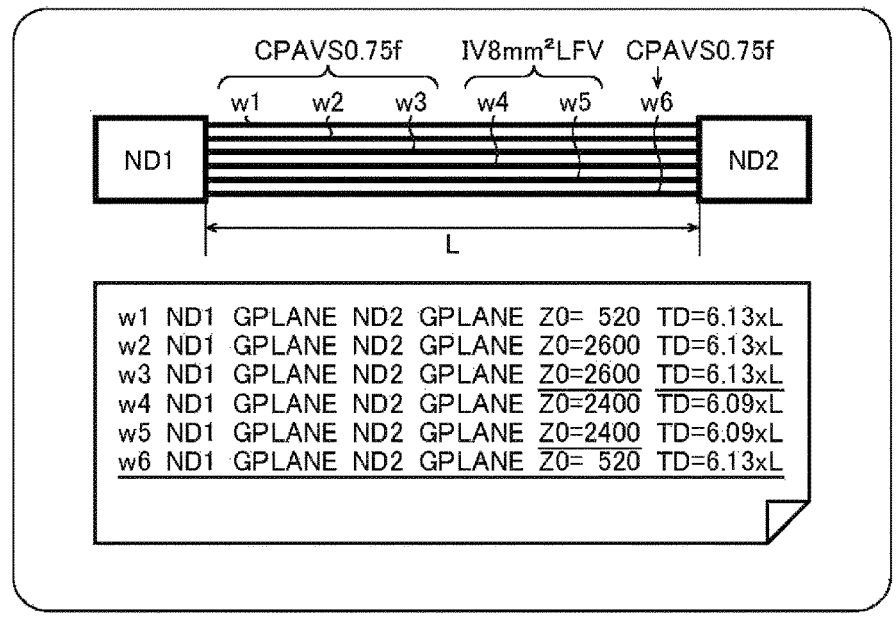

FIG. 17 is a schematic diagram showing how statements in the description of a transmission line model have to be changed when the laid states of wires are changed.

In the upper block of FIG. 17, as in FIG. 13, five wires w1 to w5 (with a total length L) are laid in parallel between a node ND1 and a node ND2. As to wire types, the wires w1 and w2 are CPAVS 0.75 f, and the wires w3 to w5 are IV 8 mm$^2$ LFV. Moreover, the wires w1 and w5 are classified as end lines, and the wires w2 to w4 are classified as middle lines. Accordingly, a transmission line model can be described, for example, as noted below.

w1 ND1 GPLANE ND2 GPLANE Z0=520 TD=6.13×L
w2 ND1 GPLANE ND2 GPLANE Z0=2600 TD=6.13×L
w3 ND1 GPLANE ND2 GPLANE Z0=2400 TD=6.09×L
w4 ND1 GPLANE ND2 GPLANE Z0=2400 TD=6.09×L
w5 ND1 GPLANE ND2 GPLANE Z0=364 TD=6.09×L

On the other hand, in the lower block of FIG. 17, the wire w3 has been changed from IV 8 mm$^2$ LFV to CPAVS 0.75 f. In addition, the wire w5 is changed from an end line to a middle line. Furthermore, as a new end line, a wire w6 (CPAVS 0.75 f) is added. Now, the statements in the description of the transmission line model can be changed as noted below.

w1 ND1 GPLANE ND2 GPLANE Z0=520 TD=6.13×L
w2 ND1 GPLANE ND2 GPLANE Z0=2600 TD=6.13×L
w3 ND1 GPLANE ND2 GPLANE Z0=2600 TD=6.13×L
w4 ND1 GPLANE ND2 GPLANE Z0=2400 TD=6.09×L
w5 ND1 GPLANE ND2 GPLANE Z0=2400 TD=6.09×L
w6 ND1 GPLANE ND2 GPLANE Z0=520 TD=6.13×L

The statements changed in the above description will now be described. First, as for the wire w3, as the wire type is changed (from IV 8 mm$^2$ LFV to CPAVS 0.75 f), the characteristic impedance Z0 of the wire w3 is changed from "2400" to "2600," and in addition the delay time TD of the wire w3 is changed from "6.09×L" to "6.13×L." As for the wire w5, as the model classification is changed (from an end line to a middle line), the characteristic impedance Z0 of the wire w5 is changed from "364" to "2400." Moreover, as the wire w6 is added, the description now includes one more line to accommodate statements for the wire w6. Incidentally, the statements for the wire w6 are the same as those for the wire w1.

As described above, by changing the parameters (for example, characteristic impedance, delay time, and number of wires laid) of a transmission line model as necessary, it is possible to describe in a simple manner a variety of electric component measurement environment structures, and further to reproduce wire harness structures that are laid on vehicles. Thus, it is possible to cover by computer simulation a sufficient number of phenomena that can actually occur without being bound by restrictions posed in measurement benchmarks.

Figure 18:
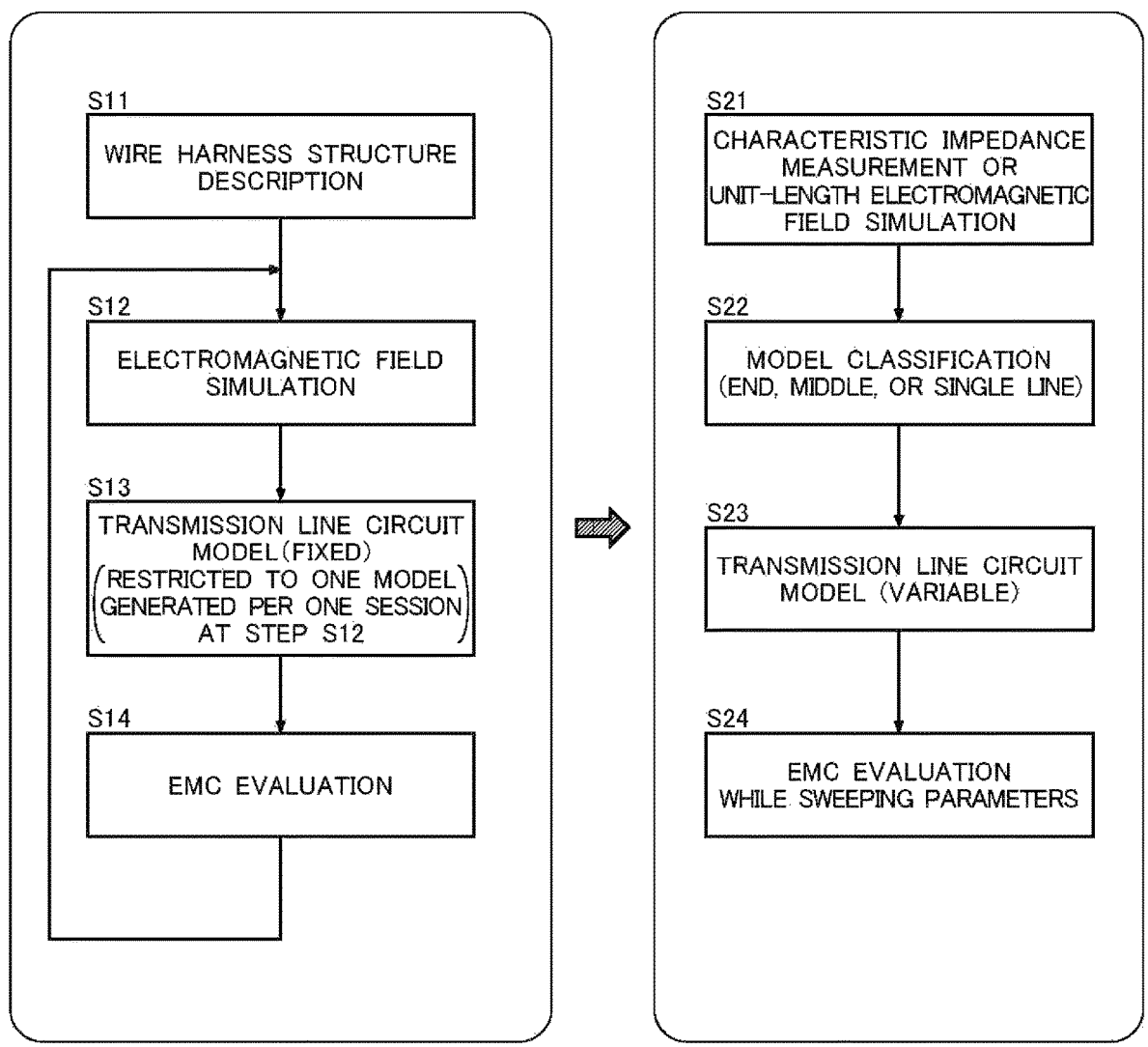
FIG. 18 is a flow chart showing conventional and novel EMC evaluation methods in comparison with each other.

FIG. 18 is a flow chart showing a conventional and a novel EMC evaluation method in comparison with each other. In the left column of the diagram, the operation flow of a common EMC evaluation method is shown. On the other hand, in the right column of the diagram, the operation flow of a novel EMC evaluation method proposed herein is shown.

As shown in the left column of FIG. 18, in the common EMC evaluation method, first, at step S11, for each vehicle, the wire harness structure is described. This wire harness structure is obtained by analyzing the wire harness network laid around the vehicle on a three dimensional basis and describing based on the analysis results the structural features in detail.

Subsequently, at step S12, by use of the above-mentioned wire harness structure, electromagnetic field simulation is performed, and then subsequently, at step S13, a transmission line circuit model fixed to each vehicle is generated. Here, there is a natural restriction: only one transmission line circuit model can be generated through one session of electromagnetic field simulation at step S12.

Thereafter, at step S14, through computer simulation using the above-mentioned transmission line circuit model, EMC evaluation of an electric components (evaluation of its immunity characteristics or emission characteristics) is performed. Here, as mentioned above, only one transmission line circuit model can be generated through one session of electromagnetic field simulation; accordingly, in a case where EMC evaluation of an electric component needs to be performed by use of a plurality of transmission line circuit models, the electromagnetic field simulation at step S12 has to be repeated under varying conditions as many times as the number of types of transmission line circuit models (the number of fixed configurations).

However, performing one session of electromagnetic field simulation requires at least several tens of hours, and performing it with higher simulation accuracy may require as many as several hundred hours. Thus, an attempt to generate a large number of transmission line circuit models to completely cover all condition changes of which some examples have been discussed previously with reference to FIGS. 15 to 17 (increasing the number of noise injection points, changing the noise injection position, changing the total wire length, and changing the laid states of wires) requires several hundred to several thousand hours, and this method can by no means be said to be a practical one.

As discussed above, the EMC evaluation flow in the left block of FIG. 18 first of all presupposes a particular vehicle, and is therefore not very versatile. It is thus unsuitable for EMC evaluation of electric components mounted on unspecified vehicles or for computer simulation performed with consideration given to changes in wire harness structure that occur during actual running of vehicles.

On the other hand, as shown in the right column of FIG. 18, in the novel EMC evaluation method proposed herein, first, at step S1, a wire harness is subjected to characteristic impedance measurement. The characteristic impedance measurement here can be performed for each of different wire types (for example, CPAVS 0.75 f and IV 8 mm² LFV). The specific content of this step has already been described with reference to FIGS. 10 and 11, and therefore no overlapping description will be repeated. The characteristic impedance of the wire harness may instead be acquired through unit-length electromagnetic field simulation.

Next, at step S2, the plurality of wires constituting the wire harness are subjected to model classification (among end lines, middle lines, and a single line). Like the characteristic impedance measurement above, the model classification here also can be performed for each of different wire types. The specific content of this step also has already been described with reference to FIGS. 9A to 9C and 12, and therefore no overlapping description will be repeated.

Thereafter, at step S3, by appropriately combining a plurality of finely differentiated transmission line models with various elements connected to them (a DUT model, a LISN model, a battery model, and the like), a variable transmission line circuit model is generated. That is, the transmission line circuit model generated at this step includes parameters related to the noise injection position and the laid states of wires (and hence the very structure of the wire harness), and their values are left variable, enabling reproduction of a great variety of test conditions.

Based on what has been done above, subsequently, at step S4, through computer simulation using the above-mentioned transmission line circuit model, while various parameters (for example, characteristic impedance, delay time, and number of wires laid) are swept appropriately, EMC evaluation of an electric component is performed. That is, at this step, it is possible to reproduce a great variety of test conditions (that is, wire harness structures) while varying various parameters without repeating electromagnetic field simulation (see step S12), which requires long time. It is thus possible to screen out the worst conditions very efficiently in a short time.

As described above, the conventional and novel EMC evaluation methods differ greatly in whether or not electromagnetic field simulation is required every task of changing test conditions. That is, with the EMC evaluation method proposed herein, a great variety of vehicle structures can be parametrized without being forcedly consolidated into one, and thus test conditions can be varied continuously independently of electromagnetic field simulation. It is thus possible to achieve higher flexibility in setting test condition, and thus to evaluate the immunity characteristics or emission characteristics of electric components more properly than ever.

Figure 19:
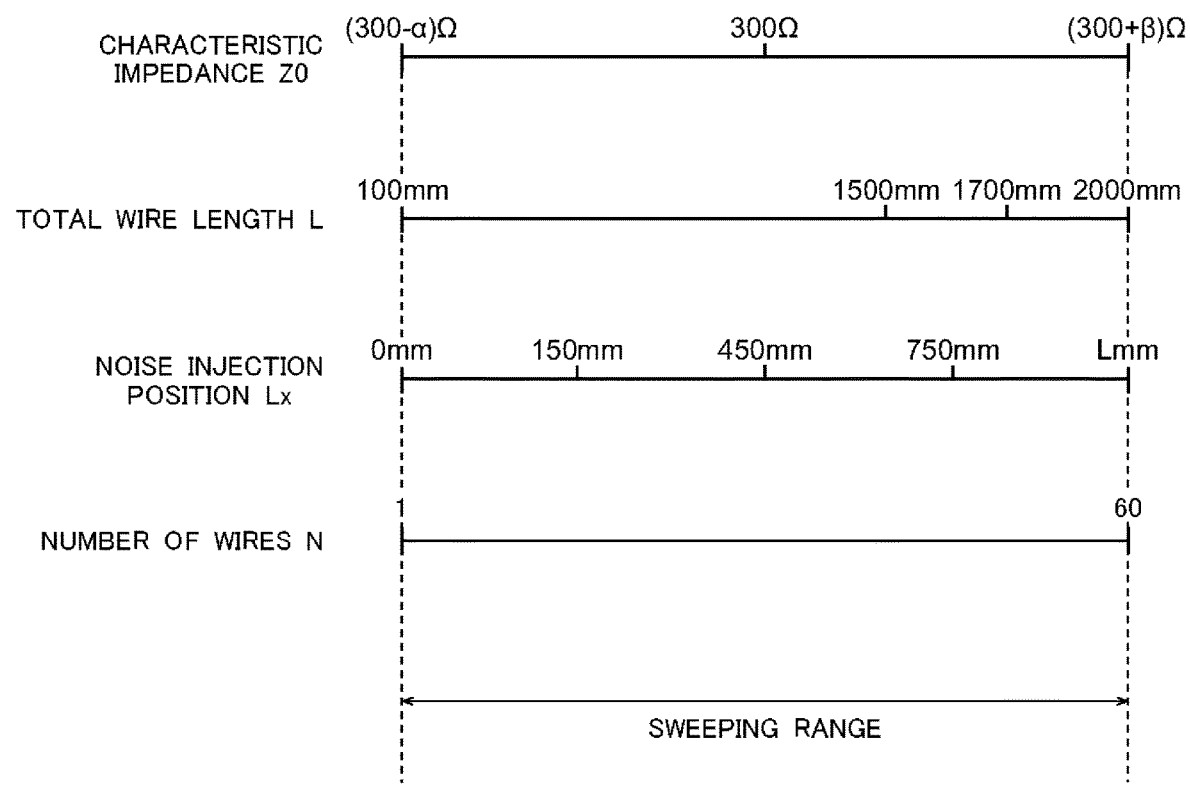
FIG. 19 is a schematic diagram showing sweeping ranges of parameters.

Parameter Sweeping Ranges:

FIG. 19 is a schematic diagram showing the sweeping ranges of different parameters (characteristic impedance, total wire length, noise injection position, and number of wires) at step S4.

The characteristic impedance Z0 is swept so as to reproduce change of wires' laid states or wire types. Change of wires' laid states includes, in addition to change of model classification (end-line, middle-line, and single-line models) mentioned previously, any change in states that can affect the characteristic impedance of wires, such as displacement of wires (change of the distances of wires from the ground plane resulting from vibration during running, secular change, change in temperature, change in humidity, and the like), change of the vehicle type (vehicle structure), and change of the body material.

The sweeping range of the characteristic impedance $Z0$ can be set to be $(300-\alpha)\Omega \leq Z0 \leq (300+\beta)\Omega$ so as to include the value (for example $300\Omega$) on which a restriction similar to that in a measurement bench mark is posed. Likewise, the sweeping ranges of the total wire length L and the noise injection position Lx can be set so as to include values on which restrictions similar to those in a measurement bench mark are posed. For example, the sweeping range of the total wire length L can be set to be 100 mm≤L≤2000 mm so as to include the range of 1500 mm to 1700 mm with consideration given to wires' laid lengths in actual devices. For another example, the sweeping range of the noise injection position Lx can be set to be 0 mm≤Lx≤L mm so as to include 150 mm, 450 mm, and 750 mm.

As described above, once the sweeping ranges of the characteristic impedance Z0, the total wire length L, and the noise injection position Lx are set, it is possible to check simulation results (check simulation results against measured results) by use of a measurement bench mark as described above.

The sweeping of the total wire length L and the noise injection position Lx is achieved by sweeping the delay time TD so as to reproduce that.

The sweeping range of the number N of wires can be set to be 1≤N≤60 with consideration given to the actual wire harness.

Although the above description deals with examples where the sweeping ranges of different parameters are set based on a measurement bench mark, this is not meant to limit the method for setting them. For example, the sweeping ranges of different parameters may be set so as to include values determined from a structural description (step S11 in FIG. 18) of the transmission line circuit in an actual device.

With such setting, it is possible to perform computer simulation that faithfully reflects various conditions that can occur on an actual vehicle. Thus, even such phenomena (for example, unintended variation of immunity characteristics and emission characteristics ascribable to displacement of wires resulting from vibration during running) as go overlooked by the conventional EMC evaluation method (in the left column in FIG. 18) however long it may be performed can be evaluated without being overlooked.

Other Modifications:

Various technical features disclosed herein can be implemented in any manner other than specifically described above, and allow for many modifications within the spirit of the technical ingenuity involved. That is, it should be understood that the embodiments disclosed herein are in every aspect illustrative and not restrictive, and that the technical scope of the present invention is defined not by the description of embodiments given above but by the scope of the appended claims and encompasses any modification in the sense and scope equivalent to those of the claims.

Industrial Applicability:

The invention disclosed herein finds application, for example, in EMC computer simulation for evaluating the immunity characteristics or emission characteristics of structures (such as vehicles, railroad vehicles, marine vessels, and aircraft) that have an electric conductor wire harness.

What is claimed is:

1. A computer simulator configured to simulate immunity characteristics or electronic emission characteristics of a vehicle wire harness network laid in a vehicle, the vehicle comprising a ground vehicle, a railroad vehicle, a marine vessel, or an aircraft, wherein the vehicle wire harness comprises a plurality of wires laid in parallel, the computer simulator comprising:

an end-line model configured to model an end line included in the plurality of wires laid in parallel, the end line having at least one wire on a first side thereof an no other wire on a second side thereof; and a middle-line model configured to model a middle line included in the plurality of wires laid in parallel, the middle line having at least one wire on either side thereof, wherein each of the end-line model and the middle-line model includes, as parameters representing transmission characteristics thereof, a respective characteristic impedance and a respective delay time, wherein the characteristic impedance of the end-line model is lower than the characteristic impedance of the middle-line model, and a value of the characteristic impedance for both the end-line model and the middle-line model is a function of a type of wire being modeled, the delay time is proportional to a laid length of the plurality of wires and to a unit delay time per unit length, wherein the unit delay time per unit length is a function of the type of wire being modeled, wherein for a selected wire type, a value of the unit delay time per unit is the same for both the end-line model and the middle-line model, wherein the computer simulator is configured to simulate the immunity characteristics or electronic emission characteristics of the ground vehicle, the railroad vehicle, the marine vessel, or the aircraft while sweeping the characteristic impedance and the delay time of each of the end-line model and the middle-line model and a laid number of the wires, wherein a sweeping range of the characteristic impedance and the delay time includes a value on which a same restriction as a restriction in a measurement bench mark is posed or a value that is determined by a structure description of a transmission line circuit in an actual device, wherein the delay time is swept so as to reproduce change of a total length of the wires or change of a position of a noise injection point, and wherein:

the sweeping range of the characteristic impedance is set so as to include 300 $\Omega$, a sweeping range of the total length of the wires is set so as to include the range of 100 mm to 2000 mm, a sweeping range of the noise injection point is set so as to include 150 mm, 450 mm, and 750 mm, and a sweeping range of the laid number of the wires is set so as to include 1 to 60.

2. The computer simulator of claim 1, wherein the characteristic impedance is swept so as to reproduce change of a laid state of the wires or change of a type of the transmission line.

* * * * *